United States Patent
Minoo et al.

(10) Patent No.: US 11,622,121 B2
(45) Date of Patent: Apr. 4, 2023

(54) SCALABLE CODING OF VIDEO SEQUENCES USING TONE MAPPING AND DIFFERENT COLOR GAMUTS

(71) Applicant: ARRIS Enterprises LLC, Suwanee, GA (US)

(72) Inventors: Koohyar Minoo, San Diego, CA (US); Ajay K. Luthra, San Diego, CA (US); David M. Baylon, San Diego, CA (US)

(73) Assignee: ARRIS Enterprises LLC, Suwanee, GA (US)

(*) Notice: Subject to any disclaimer, the term of this patent is extended or adjusted under 35 U.S.C. 154(b) by 0 days.

(21) Appl. No.: 17/740,220

(22) Filed: May 9, 2022

(65) Prior Publication Data
US 2022/0272366 A1    Aug. 25, 2022

Related U.S. Application Data

(63) Continuation of application No. 14/662,376, filed on Mar. 19, 2015, now Pat. No. 11,363,281.
(Continued)

(51) Int. Cl.
*H04N 19/36* (2014.01)
*H04N 19/34* (2014.01)
(Continued)

(52) U.S. Cl.
CPC ........... *H04N 19/36* (2014.11); *H04N 19/127* (2014.11); *H04N 19/147* (2014.11);
(Continued)

(58) Field of Classification Search
CPC .... H04N 19/36; H04N 19/127; H04N 19/147; H04N 19/187; H04N 19/30; H04N 19/33;
(Continued)

(56) References Cited

U.S. PATENT DOCUMENTS

| 8,737,474 B2 | 5/2014 | Gao et al. |
| 8,934,542 B2 | 1/2015 | Wiegand et al. |

(Continued)

FOREIGN PATENT DOCUMENTS

| EP | 2843951 A1 | 3/2015 |
| WO | 2015/054307 A2 | 4/2015 |

OTHER PUBLICATIONS

L. Kerofsky, et al., "Color Gamut Scalable Video Coding: New Results", 12th JCT-VC meeting (Joint Collaborative Team on Video Coding of ISO/IEC JTC1/SC29/WG11), Jan. 2013.
(Continued)

*Primary Examiner* — Susan E. Torgerson
(74) *Attorney, Agent, or Firm* — Chernoff, Vilhauer, McClung & Stenzel, LLP

(57) ABSTRACT

A Scalable Video Coding (SVC) process is provided for scalable video coding that takes into account color gamut primaries along with spatial resolution. The process provides for re-sampling using video color data obtained from an encoder or decoder process of a base layer (BL) in a multi-layer system to enable improved encoding and decoding in an enhancement layer (EL) or higher layers taking into account color conversion between layers. Examples of applicable SVC include MPEG-4 Advanced Video Coding (AVC) and High Efficiency Video Coding (HEVC). With the SVC process, video data expressed in one color gamut space can be used for prediction in encoding with a possibly different color space, and accommodation for different spatial resolution and bit-depth can be made as well.

5 Claims, 3 Drawing Sheets

Related U.S. Application Data

(60) Provisional application No. 61/955,773, filed on Mar. 19, 2014.

(51) Int. Cl.
| | | |
|---|---|---|
| *H04N 19/80* | (2014.01) | |
| *H04N 19/33* | (2014.01) | |
| *H04N 19/187* | (2014.01) | |
| *H04N 19/46* | (2014.01) | |
| *H04N 19/127* | (2014.01) | |
| *H04N 19/30* | (2014.01) | |
| *H04N 19/147* | (2014.01) | |
| *H04N 19/186* | (2014.01) | |

(52) U.S. Cl.
CPC ........... *H04N 19/187* (2014.11); *H04N 19/30* (2014.11); *H04N 19/33* (2014.11); *H04N 19/34* (2014.11); *H04N 19/46* (2014.11); *H04N 19/80* (2014.11); *H04N 19/186* (2014.11)

(58) Field of Classification Search
CPC ........ H04N 19/34; H04N 19/46; H04N 19/80; H04N 19/186; H04N 19/117; H04N 19/132; H04N 19/96
USPC ........................................................ 375/240
See application file for complete search history.

(56) References Cited

U.S. PATENT DOCUMENTS

| | | | |
|---|---|---|---|
| 9,961,365 | B2 | 5/2018 | Alshina et al. |
| 2010/0135393 | A1* | 6/2010 | Ying Gao .............. H04N 19/59 375/240.15 |
| 2011/0154426 | A1 | 6/2011 | Doser et al. |
| 2013/0177066 | A1 | 7/2013 | Ye et al. |
| 2014/0086318 | A1 | 3/2014 | Kerofsky et al. |
| 2016/0057454 | A1 | 2/2016 | Bordes et al. |

OTHER PUBLICATIONS

PCT Search Report & Written Opinion, RE: Application No. PCT/US215/021402, dated Jul. 23, 2015.

L. Kerofsky, et al., "Color Gamut Scalable Video Coding", 11th JCT-VC meeting, 102nd MPEG Meeting (Joint Collaborative Team on Video Coding of ISO/IEC JTC1/SC29/WG11 and ITU-T SG.16). Oct. 2, 2012.

C. Auyeung, "Non=SCE4: Picture and region adaptive gain-offset prediction for color space scalability", 15th JCT-VC Meeting (Joint Collaborative Team on Video Coding of ISO/IEC JTC1/SC29/WG11 and ITU-T SG.16), Oct. 15, 2013, pp. 1-2, 4-5.

P. Bordes, et al., "Color Gamut Scalable Video Coding for SHVC", 2013 Picture Coding Symposium (PCS), IEEE, Dec. 8, 2013, pp. 301-304.

A. Aminlou, et al., "Non-SCE1: Color gamut scalability using modified weighted prediction", 16th JCT-VC Meeting (Joint Collaborative Team on Video Coding of ISO/IEC JTC1/SC29/WG11 and ITU-T SG. 16), Jan. 9, 2014, pp. 1-3.

L. Kerofsky, et al., "Color Gamut Scalable Video Coding", 2013 Data Compression Conference, Mar. 1, 2013, pp. 211-215.

\* cited by examiner

SCALABLE CODING OF VIDEO SEQUENCES USING TONE MAPPING AND DIFFERENT COLOR GAMUTS

CROSS REFERENCE TO RELATED APPLICATION

This Application is a continuation of U.S. patent application Ser. No. 14/662,376, filed Mar. 19, 2015, which claims priority under 35 U.S.C. § 119(e) from earlier filed U.S. Provisional Application Ser. No. 61/955,773 filed on Mar. 19, 2014, which are incorporated herein by reference in their entirety.

BACKGROUND

Technical Field

The present invention relates to the process of using a two layer Scalable Video Coding (SVC) scheme for encoding and decoding of video sequences derived from the same source with differences in resolution. More specifically, it relates to arranging, prediction and reconstruction of video data obtained from an encoder or decoder process during scalable coding. Examples of scalable encoder or decoder processes include MPEG-4 Advanced Video Coding (AVC) and High Efficiency Video Coding (HEVC) that can be labeled Scalable HEVC (SHVC).

Related Art

An example of a scalable video coding system using two layers where color tone mapping can be applied is shown in FIG. 1. In the system of FIG. 1, one of the two layers is the Base Layer (BL) where a BL video is encoded in an Encoder E0, labeled 100, and decoded in a decoder D0, labeled 102, to produce a base layer video output BL out. The BL video is typically at a lower quality than the Enhancement Layer (EL) that receives an input y from the Full Resolution (FR) layer. The EL includes an encoder E1, labeled 104, for encoding the FR video, as well as a decoder D1, labeled 106. In encoding in encoder E1 104 of the full resolution video, cross-layer (CL) information from the BL encoder 100 is used to produce enhancement layer (EL) information. The corresponding EL bitstream of the full resolution layer is then decoded in decoder D1 106 using the CL information from decoder D0 102 of the BL to output full resolution video, FR out. By using CL information in a scalable video coding system, the encoded information can be transmitted more efficiently in the EL than if the FR was encoded independently without the CL information. An example of SVC coding that can use two layers shown in FIG. 1 includes video coding using AVC and HEVC.

In spatial scalability, the BL is typically at a lower spatial resolution than Full Resolution (FR), as illustrated in FIG. 1 with a downsampling conversion process is applied from FR to BL. FIG. 1 shows block 108 with a down-arrow r illustrating a resolution reduction from the FR to the BL to illustrate that the BL can be created by a downsampling of the FR layer data. Overall, the down arrow of block 108 illustrates that for scalability, the base layer BL is typically at a lower spatial resolution than the full resolution FR layer. It is worth noting that the multilayer methods described apply when there are more than two layers.

The CL information from the BL later can be used after upsampling to enhance the coding of the FR video in the EL. In the system of FIG. 1 in combination with an upsampler of FIG. 2, the CL information includes pixel information derived from the encoding and decoding process of the BL. Because the BL pictures are at a different spatial resolution than the FR pictures, a BL picture needs to be upsampled (or re-sampled) back to the FR picture resolution in order to generate a suitable prediction for the FR picture.

SUMMARY

Embodiments of the present invention provide systems for SVC that account for color gamut conversion between layers as well as spatial resolution conversion in some embodiments. The process provides for re-sampling using video color data obtained from an encoder or decoder process of a base layer (BL) in a multi-layer system to enable improved encoding and decoding in an enhancement layer (EL) or higher layers taking into account color conversion between layers. For example, with the reconstructed data, video data expressed in a lower resolution in one color gamut space can be used to predict a higher resolution video in another color gamut space and can also account for a different bit-depth.

In one further embodiment, a different color mapping is applied to different regions of a video frame. The mapping to different frame regions can be done by at least one of the following procedures: (a) signaling linear or non-linear 3DLUT color mapping parameters with an adaptive quad-tree structure; (b) signaling mapping parameters in the slice or tile headers to create the same spatial freedom for correcting the color tones; (c) signaling to reuse collocated partitioning and color mapping parameters from previous frames; and (d) using the adaptive quad-tree partitioning to adaptively signal filter parameters in the case that spatial scalability is also applied.

In a further embodiment, both color tone mapping from a base to a target color gamut and spatial scaling are separately applied in an order where one is applied first and then the other. In one embodiment when the color gamut scaling is applied for a tone mapping function in an encoder side, the tone mapping function occurs after spatial scaling. Then the reverse order of spatial scaling applied first and then tone mapping applied occurs at a decoder side.

In a further embodiment, the tone mapping is applied as a function mapping from a vector of three color values in one color gamut space to a corresponding vector of three color values in a different gamut space. The mapping can also map to values in the same color space. The mapping at the encoder is then applied on a three-color-component grid that is different than a grid a Base Layer (BL) is on. In this embodiment, a relative location of luma and chroma samples in vertical and horizontal dimensions are signaled to a decoder to enable the decoder to adjust the sample locations to reverse the one used for the tone mapping in a forward direction.

BRIEF DESCRIPTION OF THE DRAWINGS

Further details of the present invention are explained with the help of the attached drawings in which.

DETAILED DESCRIPTION

Color Tone Mapping Overview

To properly display a captured picture or video on different displays, in embodiments of the present invention a color mapping is applied to map the video display content from one color space to another, or within a same color space. For this process, in its most common form, color tones from a set of primary color values in one layer for a pixel are mapped in the picture to a different set of color values for another layer, referred to as a target color gamut. The mapping is applied so that the color values for the second layer are suitable for presentation of the content on displays conforming to the target color gamut. The sections below describe features of a Scalable Video Coding (SVC) process that provides for such color tone mapping.

I. Scalability Process Accounting for Color Gamut and Bit-Depth

Figure 1:
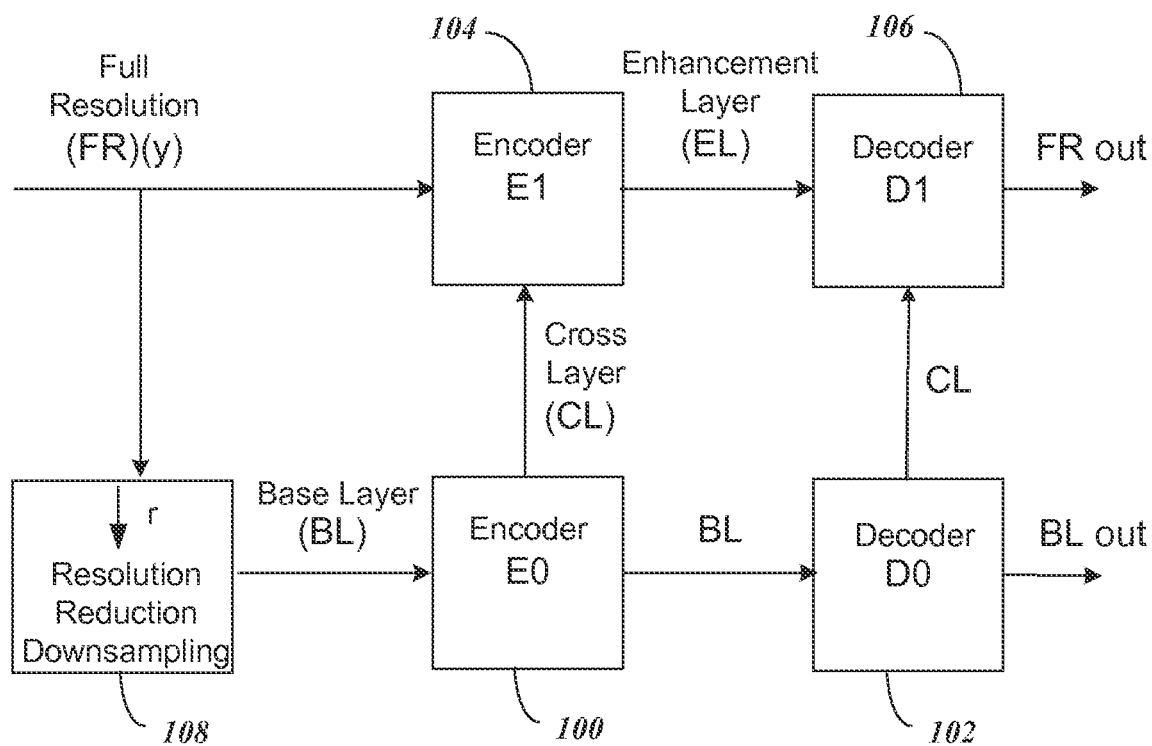
FIG. 1 is a block diagram of components in a scalable video coding system with two layers.
Figure 3:
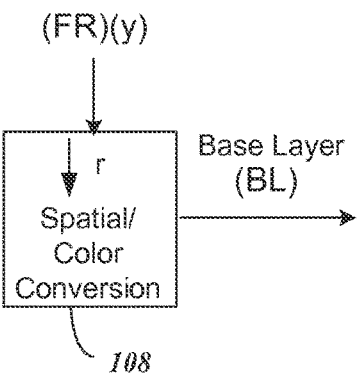
FIG. 3 shows the downsampler of FIG. 1 that also allows for color mapping.

In some embodiments of the present invention, the same capture content needs to be displayed on different displays with a different color gamut specification and possibly with a different bit-per sample and possibly with a different resolution. The process of color mapping takes a triplet sample from one color gamut space and maps it to the corresponding sample in the same spatial location of the other color gamut space. This process can be non-linear and content or region dependent. The process on downsampling that considers color and spatial conversion from the FR to the BL layer is illustrated in FIG. 3 that can be applied to block 108 of FIG. 1.

Figure 2:
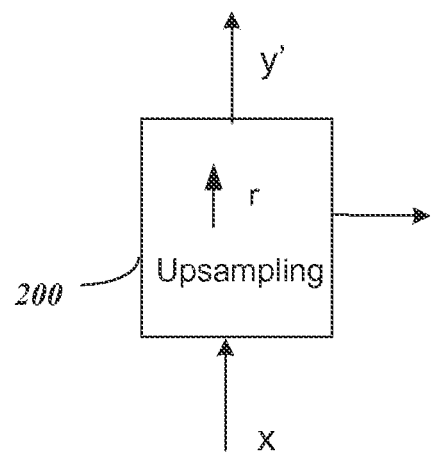
FIG. 2 illustrates an upsampling process that can be used to convert the base layer data to the full resolution layer data for FIG. 1.
Figure 4:
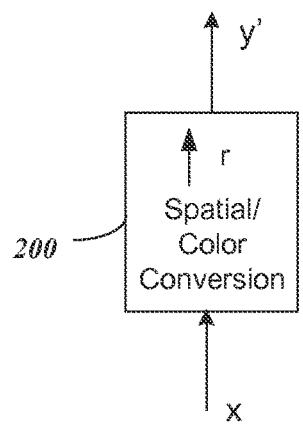
FIG. 4 shows the upsampler of FIG. 2 that also allows for color mapping.

The process of upsampling which involves different color gamut spaces and resolutions from BL to EL are shown in FIG. 4 that can be used in block 200 of FIG. 2. The process of FIG. 4 can be applied at both the encoder and decoder side. For upsampling shown in FIG. 4, the data at resolution x is derived from the encoding and decoding process at the BL. A BL picture is processed by a combination of color mapping and upsampling in any known order to generate a y' output as shown in FIG. 4 that can be used as a basis for prediction of the original EL input y.

Figure 5:
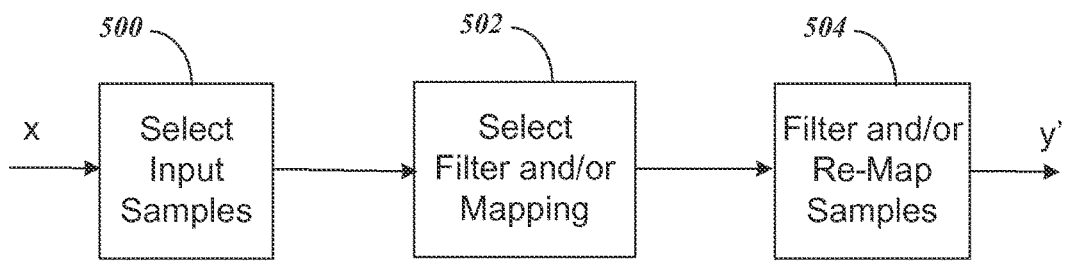
FIG. 5 shows a block diagram of components for implementing the upsampling process of FIG. 4 according to embodiment of the present invention.

FIG. 5 shows a more detailed block diagram for implementing the upsampling process of FIG. 4 for embodiments of the present invention. The upsampling or re-sampling process can be determined to minimize an error E (e.g. mean-squared error) between the upsampled data y' and the full resolution data y. The system of FIG. 5 includes a select input samples module 500 that samples an input video signal. The system further includes a select filter and/or color mapping module 502 to select a filter or map from the subsequent filter and/or re-map samples module 504 to upsample the selected input samples from module 500.

In module 500, a set of input samples in a video signal x is first selected. In general, the samples can be a two-dimensional subset of samples in x, and a two-dimensional filter or two dimensional mapping structure can be applied to the samples, depending on the set of input samples. The module 502 receives the data samples in x from module 500 and identifies an appropriate filter or map function in module 504 to direct the samples toward.

For the case where separate filters are used, a filter h[n; m] is applied along the rows and columns to the selected samples to produce an output value of y', or in this case y' [m] for each of the columns. Typically, this can be implemented with a set of M filters h, where for the output value y'[m] at output index m, the filter h[n; m mod M] is chosen and is applied to the corresponding input samples x of the rows. The filters h[n; p] where p=m mod M generally correspond to filters with M different phase offsets, for example with phase offsets of p/M, where p=0, 1, ..., M−1. The total output of the filtering process using the selected filter h[n;m] on the selected input samples produces output value y'.

In addition to filtering, a color mapping calculation may be applied to convert to a different or the same color space. This mapping operation can be performed to minimize an error cost. FIG. 5 shows that both the upsampling and color processing operations may be performed in the same prediction process using either filtering or mapping for color conversion.

The modules in FIG. 3, 4 or 5 can include one or more processors and memory devices that enable the functions described to be accomplished. The memory is configured to store code that when executed by the processor causes the module to function as described to process video signals. The memory can also store data to enable the functions described to be accomplished. In addition to the modules of FIGS. 3-5, other components of FIG. 1 can include such processor and memory components.

II. Color Mapping Enhancements

The following sections describe further features that can be applied in embodiments of the present invention for SVC that better account for color and spatial conversion.

A. Signaling the Order of Spatial Scaling and Color Mapping

In cases that both spatial scaling and color gamut scaling are required, the order in which those processes are done at the encoder can be varied. Since the down-sampling and tone mapping are usually highly non-linear and non-reversible operations, it is proposed in some embodiments to signal the order by which the decoder should reconstruct the prediction for higher resolution at a different color gamut and spatial scaling.

An example of combined spatial and color gamut scalability is from 1080p BT.709 for BL to 4K BT.2020 for EL. In this case the encoder can have the option of going from 4K BT.2020 to 4K BT.709 first and then down-sample the 4K BT.709 to 1080p BT.709. In another example the down-sampling takes place first to generate 1080p BT.2020 and then the color mapping takes place to create 1080p BT.709 from 1080p BT2020.

Figure 6:
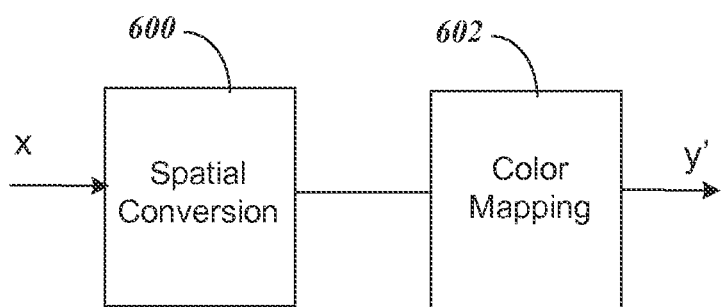
FIG. 6 shows a process for one embodiment of the present invention where during up-sampling spatial resolution conversion is applied first and then the color mapping changes to the color gamut space are applied.
Figure 7:
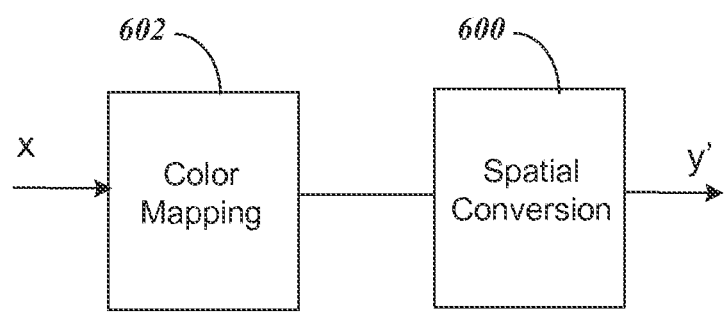
FIG. 7 shows an alternative to FIG. 6, where the color mapping will be done first and then spatial up-sampling takes place afterward.

In a further embodiment, a flag in the bitstream would indicate, in a normative manner, the order in which BL reconstructed samples will be processed to generate the EL prediction samples. For example in one case shown in FIG. 6, the up-sampling 600 would take place first and then the color mapping 602 occurs to change to the color gamut space. In another example shown in FIG. 7, the color mapping 602 will be done first and then spatial up-sampling 600 takes place. The decision on the order of these two processes should be indicated by the encoder in order to minimize some measure of error (e.g. distortion) or cost (e.g. a combination of rate and distortion).

If a video sequence should be processed to have a desired color gamut at a resolution different than the resolution and color gamut in which the video is captured, then it is proposed to apply the tone mapping functions, in the encoder side, after the spatial scaling takes place. One advantage of this proposed order is to create less interference with the intended colors for the BL video. It is also expected that the proposed order will result in higher coding efficiency of the scalable compression, since the reverse tone mapping (at the decoder) would be more accurate if would be performed before up-sampling and thus avoiding the distortion caused by spatial scaling.

B. Signaling Color Mapping Parameters Based on Content in Regions of a Frame

As color mapping is usually done to maintain the artistic intention of the scene, it is expected that different mappings can be applied to a different region of the frame. Therefore it is proposed to allow the encoder to signal different color mapping parameters for different locality in a given BL picture.

In one example this can be done by signaling linear or non-linear (e.g. by a 3 dimensional look up table (3DLUT)) color mapping parameters with an adaptive quad-tree structure. In another example color mapping parameters can be signaled in the slice or tile headers to create the same spatial freedom for correcting the color tones. Due to similar artistic modifications in local content among consecutive frames, it is possible to signal to re-use collocated partitioning and color mapping parameters from previous frames. In addition, the adaptive quad-tree partitioning can be used to adaptively signal filter parameters in the case that spatial scalability is also applied.

C. Content Dependent Assignment of BL and EL to a Pair of Sequences with Different Color Gamuts If there are no other criteria, such as resolution or video quality preference, it is proposed to assign sequences with different color gamuts to BL and EL, such that a cost or error can be minimized. For example, the scalable encoding of two 1080p sequences, one in BT.2020 and the other in BT.709 color spaces can result in different overall bit-rate and average PSNR, if BT.709 be used as BL and BT.2020 is used as EL vs. using BT.2020 as BL and BT.709 as EL.

D. Proposed Signaling of Chroma-Luma Alignment for Color Mapping

In most cases the tone mapping function is a mapping from a vector of three color values in one color gamut space to a corresponding vector of three color values in a different gamut space. There are cases where the color mapping at the encoder has been applied on a three-color-component grid which is different than the grid that the BL is on (e.g. due to color sub-sampling 4:4:4 vs 4:2:0 or spatial scalability). It is proposed that in these cases the relative location of luma and chroma samples (vertically and horizontally) should be signaled so the decoder can adjust the sample locations to reverse the one used for forward tone mapping.

Although the present invention has been described above with particularity, this was merely to teach one of ordinary skill in the art how to make and use the invention. Many additional modifications will fall within the scope of the invention as that scope is defined by the following claims.

What is claimed:

1. A method of decoding multi-layer video data from a bitstream comprising a plurality of layers of video data, the method comprising:
    (a) receiving samples within said bitstream of a base layer comprising a plurality of frames, each said frame having a first spatial resolution;
    (b) receiving samples within said bitstream of an enhancement layer comprising said plurality of frames, each frame having a second spatial resolution, wherein said first spatial resolution is different than said second spatial resolution;
    (c) receiving a first tone mapping information associated with said base layer;
    (d) receiving a second tone mapping information associated with said enhancement layer, wherein said first tone mapping information is different than said second tone mapping information;
    (e) receiving a base order signal within said bitstream indicating an order by which a prediction for an output set of frames where said first tone mapping information is applied first to said base layer;
    (f) receiving an enhancement order signal within said bitstream indicating an order by which a prediction for said output set of frames for where said second tone mapping information is applied first to said enhancement layer;
    (g) determining an output set of frames based upon (1) said base layer together with said first tone mapping information further based upon said base order signal, and (2) said enhancement layer together with said second tone mapping information further based upon said enhancement order signal.

2. The method of claim 1 wherein said first spatial resolution has a lower resolution than said second spatial resolution.

3. The method of claim 2 further comprising receiving cross layer information within said bitstream interrelating said base layer and said enhancement layer for said determining said output set of frames.

4. The method of claim 3 further comprising upsampling said base layer from said first spatial resolution to said second spatial resolution.

5. The method of claim 4 wherein output set of frames has an output tone map different from at least one of said first tone mapping information and said second tone mapping information.

* * * * *